(No Model.) 2 Sheets—Sheet 1.

G. A. KELLY.
PLOW.

No. 506,236. Patented Oct. 10, 1893.

Witnesses:
Jas. K. McCathran
W. S. Duvall

Inventor:
George A. Kelly
By his Attorneys.
C. A. Snow & Co.

(No Model.)  G. A. KELLY.  2 Sheets—Sheet 2.
PLOW.

No. 506,236.  Patented Oct. 10, 1893.

Witnesses
Jas. K. McCathran
W. S. Duvall

Inventor:
George A. Kelly.
By his Attorneys.
C. A. Snow & Co.

UNITED STATES PATENT OFFICE.

GEORGE A. KELLY, OF LONGVIEW, TEXAS.

PLOW.

SPECIFICATION forming part of Letters Patent No. 506,236, dated October 10, 1893.

Application filed June 12, 1893. Serial No. 477,359. (No model.)

*To all whom it may concern:*

Be it known that I, GEORGE A. KELLY, a citizen of the United States, residing at Longview, in the county of Gregg and State of Texas, have invented a new and useful Plow, of which the following is a specification.

My invention relates to improvements in moldboards for plows and to that class thereof known as turning plows, wherein the same are adapted for completely turning the soil subjected to their operation.

The objects of my present invention are to produce a moldboard for this class of plows, the same being so formed as to produce a perfect turning and thorough pulverization of the soil with the least possible minimum amount of draft and friction, and to freely shed any trash from the face of the moldboard, thereby preventing clogging. This I accomplish by a construction of plow formed upon the lines and in substantially the shape to be hereinafter described and claimed.

Figure 1:
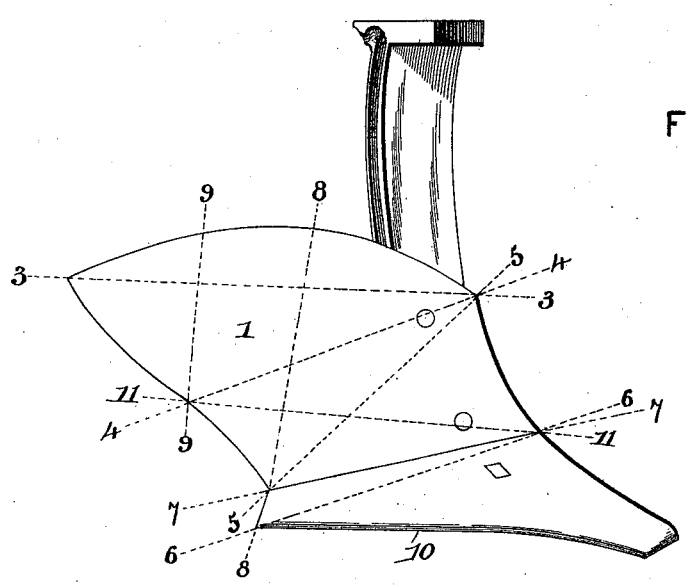
Figure 2:
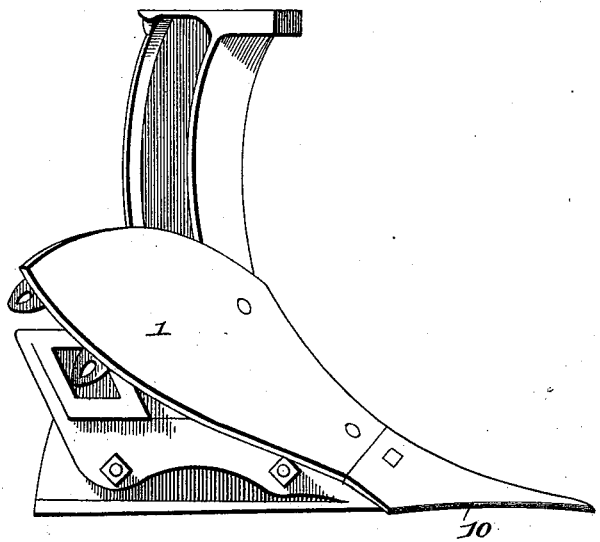
Figure 3:
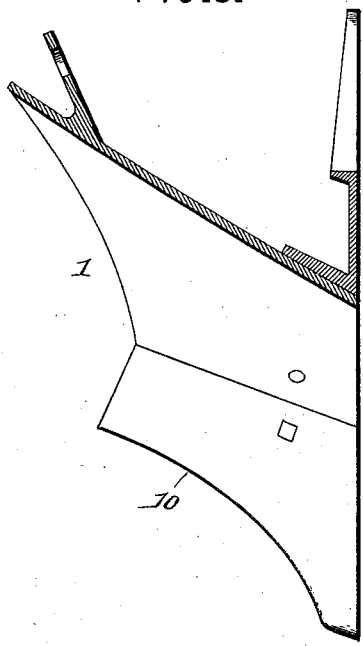
Figure 4:
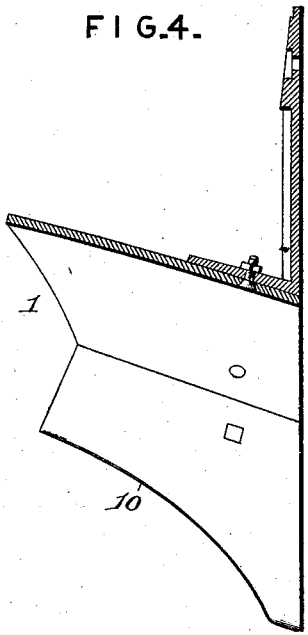
Figure 5:
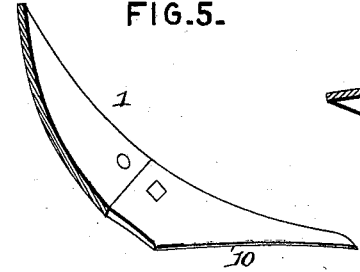
Figure 6:
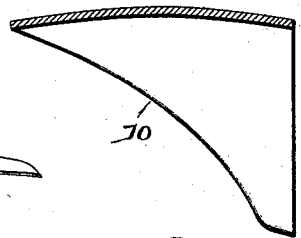
Figure 7:
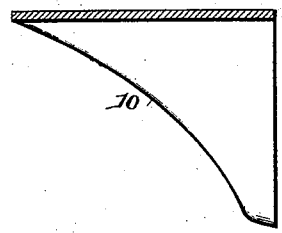
Figure 8:
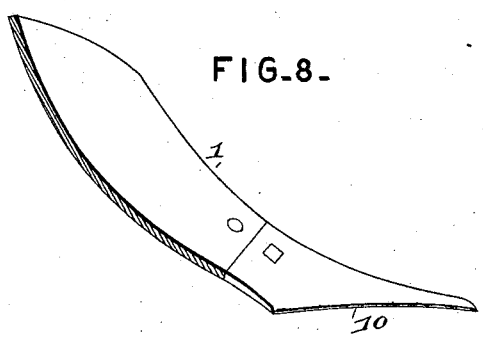
Figure 9:
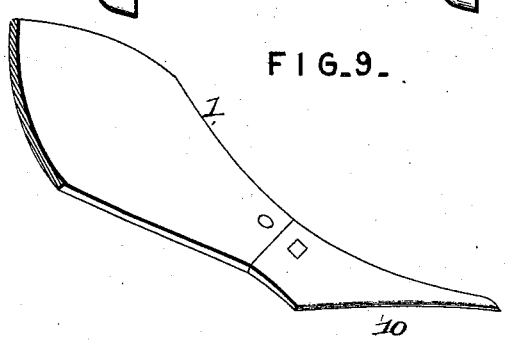

Referring to the drawings—Figure 1 is a face view of a moldboard embodying my invention. Fig. 2 is a side elevation. Fig. 3 is a section on the line 3—3. Fig. 4 is a sectional view on the line 4—4. Fig. 5 is a sectional view on the line 5—5. Fig. 6 is a sectional view on the line 6—6. Fig. 7 is a sectional view on the line 7—7. Fig. 8 is a sectional view on the line 8—8. Fig. 9 is a sectional view on the line 9—9.

Like numerals of reference indicate like parts in all the figures of the drawings.

The moldboard 1, as usual, is provided with the inner landside edge which is straight or vertical but gradually curved from the point of the shear to the upper corner of the landside, the curve being gradually deepened in the landside proper until it reaches its greatest depth between the juncture of the shear with the moldboard and the upper front corner of the latter.

For the purpose of explaining the exact shape of the moldboard I radiate from the upper front corner thereof lines 3—3, 4—4 and 5—5, the same being disposed with relation to the landside edge of the moldboard respectively as follows: fifty-two degrees, seventy-three degrees, and ninety-five degrees. A circle struck from the said corner and of a radius equaling the length of the line 4—4 will determine the length of the line 5—5, which in other words is the same length as the line 4—4, and will trisect the line 3—3, at two-thirds the distance from the upper front corner.

To determine the outer edge of the moldboard a shallow compound line is drawn from the rear upper point of the moldboard to the lower rear corner of the moldboard, half of said compound curved line being outside and between the lines 3—3 and 4—4, and the remaining half inside of and between the lines 5—5. The inclined edge 10 of the plow is parallel to the line 3—3, said edge merging into the usual point. From a point above the line 3—3 the moldboard from corner to corner is substantially vertical, and from the line 3—3 to the edge 10 of the point it is concaved uniformly from its front to its rear edges, the said concavity or curvature being increased upward from the line 11—11 which extends between the rear end of the line 4—4 and the lower corner of the moldboard.

It is well known that all plows of the turning pattern employ three cardinal principles, namely, the wedge, screw, and the inclined plane, and it has been the object and aim of my invention to combine these three principles in a congenial manner to each other so as to secure the effectiveness and advantages of each without so forming the plow as to be properly placed under the head of any one. This I accomplish through the construction of plow described and by actual experience and tests I have found that better results are secured by a plow so constructed than one under any of the above named principles. By the construction and proportions herein described I secure a minimum lightness of draft, a minimum amount of friction; I provide for an entire upsetting and complete turning of the swath and a thorough loosening and pulverization of the particles of soil composing the same as it is discharged over the rear edge of the moldboard. It will be seen that the soil moves in a curved line or path from the edge 10 of the point upward being by reason of the disposition of said edge given a screwlike course until it reaches the line 3—3. The velocity of the soil is increased between the lines 3—3 and 4—4 so that not only is the soil turned in the screw-like form, but a greater amount of pulverization is secured just as the soil is about to leave the moldboard, and as a result it falls from the same in a thoroughly pulverized upset or inverted state. All weeds and other trash that would be collected by other plows that have come under my observation and would tend to choke the same follow the same course indicated as the soil follows and are shed from the moldboard with facility, and no choking whatever occurs.

Of course soils of various natures require more or less pulverization, and I therefore do not limit the invention to the exact contour and proportions herein given, but hold that I may provide such variations as are found necessary in order to adapt the plow to the use in stiff loamy as well as loose sandy soils, and to accomplish this the principal variations would be made in the upper section of the moldboard, commencing at sectional line 4—4 and gradually either receding to the rear or coming to the front until the extreme contour of the moldboard is reached, which variations would proportionately decrease or increase the angle that 3—3 forms with the landside.

Having described my invention, what I claim is—

1. The herein described moldboard, the same having its rear corner on a line disposed at an angle of fifty-two degrees with relation to the vertical plane of its landside, its intermediate or central part on a line disposed at an angle of seventy-three degrees opposite said corner, and its lower rear corner on a line disposed at an angle of ninety-five degrees, these proportions being substantially adhered to, substantially as specified.

2. The herein described improved moldboard, the same having its rear corner, its intermediate rear edge, and its lower rear corner on lines disposed at angles of fifty-two, seventy-three and ninety-five degrees substantially with relation to the vertical plane of its landside, the distance from the upper front corner to the lower rear corner and to the center of the rear edge being equal and two-thirds the distance from said upper front corner to the rear upper corner, substantially as specified.

3. The herein described improved moldboard, the same having its upper rear corner, its rear central point, and its lower rear corner on lines disposed at substantially fifty-two, seventy-three and ninety-five degrees with relation to the vertical plane of the landside, and its rear edge formed upon a shallow compoundly curved line extending from the upper rear corner to the lower rear corner and passing at its center through the center of the rear edge, substantially as specified.

4. The herein described improved moldboard having its rear corner on a line disposed at an angle of substantially fifty-two degrees from its upper front corner and its lower front cutting edge of its share or point parallel therewith, the said moldboard being concaved between these points uniformly from front to the rear edges and the concavity being increased from about a central point to the upper end of the moldboard, substantially as specified.

In testimony that I claim the foregoing as my own I have hereto affixed my signature in the presence of two witnesses.

GEORGE A. KELLY.

Witnesses:
R. M. KELLY,
B. W. BROWN.